Dec. 8, 1931.  J. WHALEN  1,835,832
OSCILLATING ELECTRIC MOTOR
Filed Feb. 21, 1930  3 Sheets-Sheet 1

INVENTOR
JAMES WHALEN.
BY David O. Barnell
ATTORNEY

Dec. 8, 1931. J. WHALEN 1,835,832
OSCILLATING ELECTRIC MOTOR
Filed Feb. 21, 1930 3 Sheets-Sheet 2

Inventor
JAMES WHALEN.
By David O. Barnell.
Attorney

Dec. 8, 1931.  J. WHALEN  1,835,832
OSCILLATING ELECTRIC MOTOR
Filed Feb. 21, 1930  3 Sheets-Sheet 3
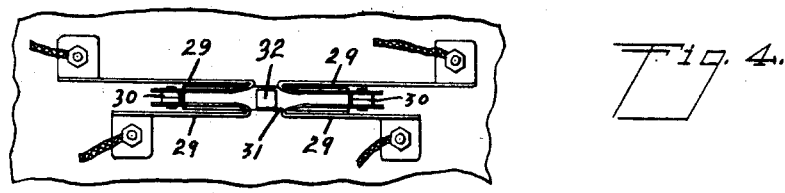
Fig. 4.
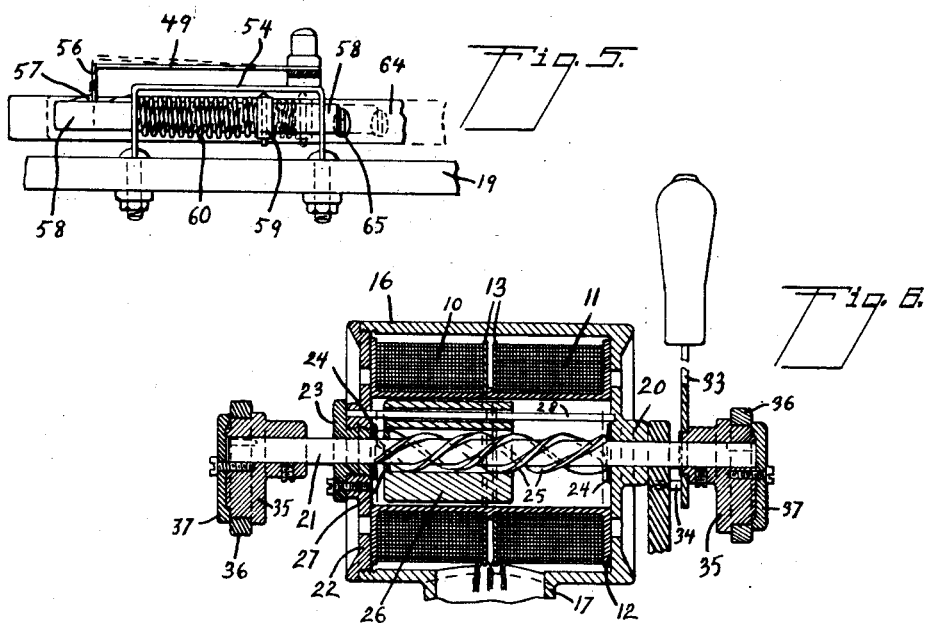
Fig. 5.
Fig. 6.
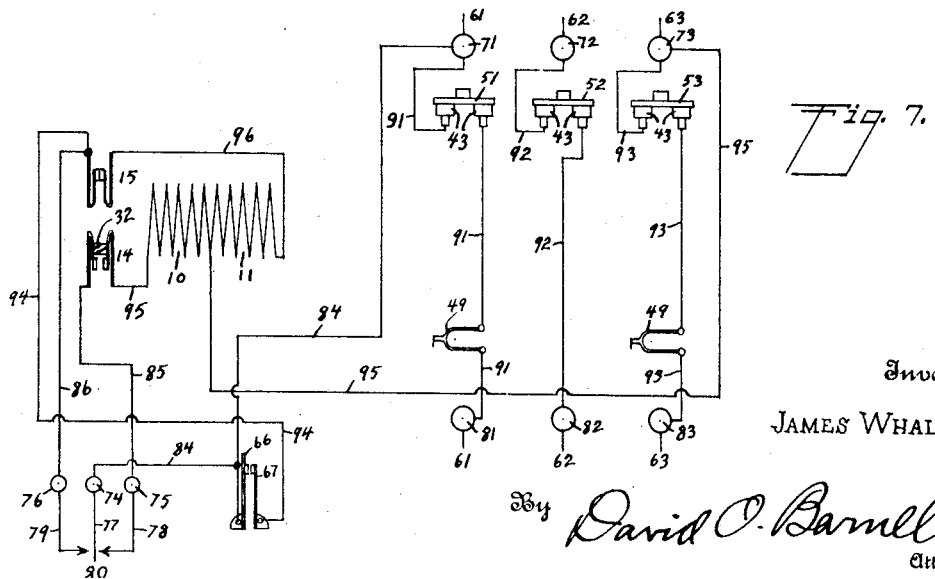
Fig. 7.
Inventor
JAMES WHALEN.
By David O. Barnell
Attorney Patented Dec. 8, 1931

1,835,832

UNITED STATES PATENT OFFICE

JAMES WHALEN, OF OMAHA, NEBRASKA

OSCILLATING ELECTRIC MOTOR

Application filed February 21, 1930. Serial No. 430,221.

My invention relates to electric motive power, and particularly to motors for producing an oscillating or alternating rotary motion. It is the object of my invention to provide a simple and inexpensive electric motive device, or motor, applicable to various uses wherein it is desired to provide a limited rotational motion in alternating directions, and to provide oscillating circuit-controlling means actuated by the motor-shaft and operating to automatically establish, at the end of each movement of the shaft, the circuit connections for causing the reverse movement. Further objects of my invention relate to the specific structure and arrangement of the parts, and will be more fully set forth hereinafter.

Figure 1:
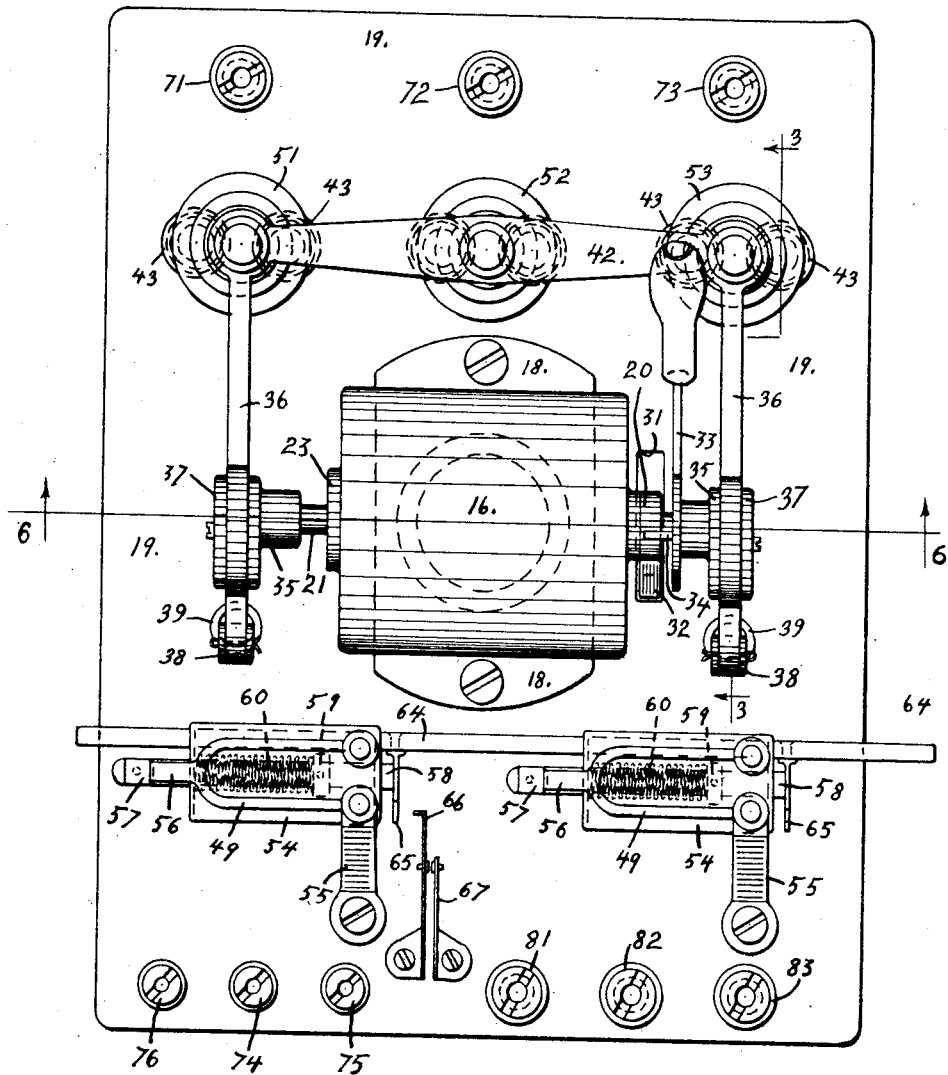
Figure 2:
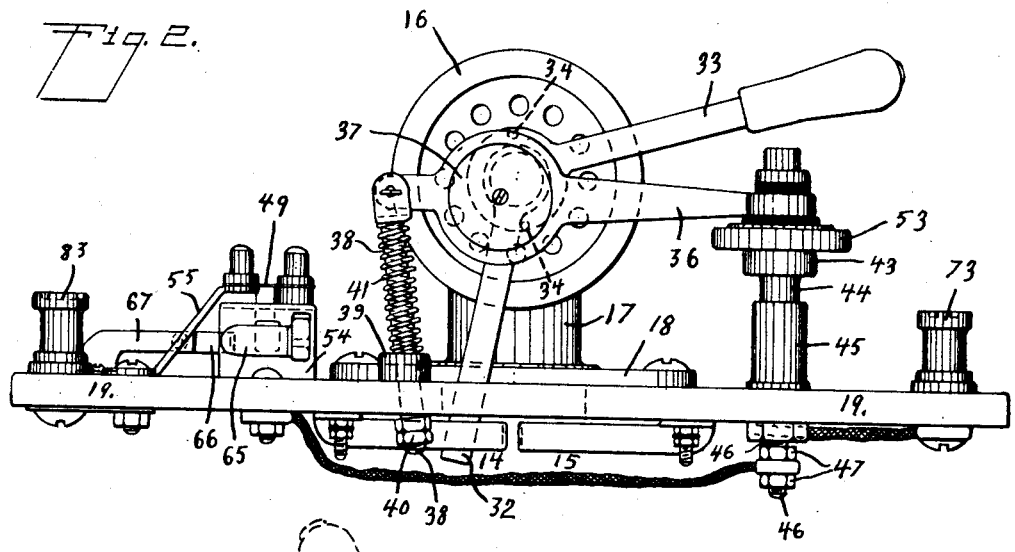
Figure 3:
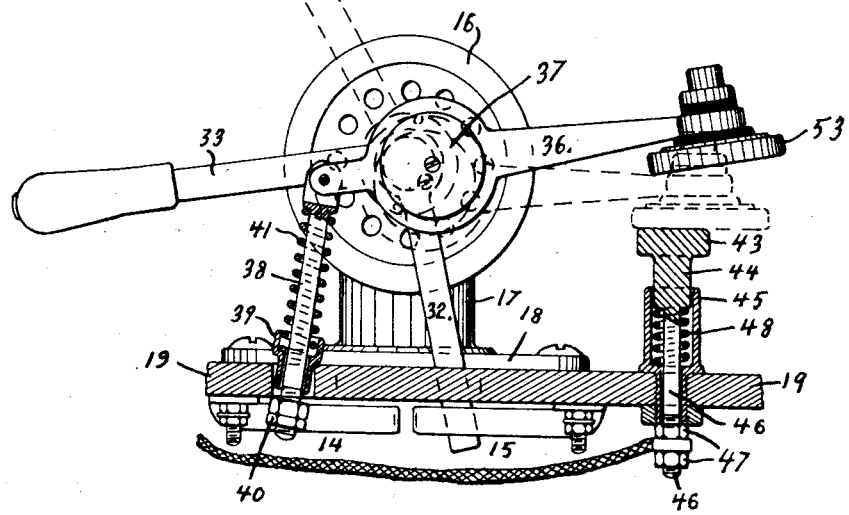

In the accompanying drawings Fig. 1 is a plan view of a motor embodying my invention, and showing the same applied as the motive element of an automatic switch for remote control of a three-phase circuit, Fig. 2 is an end view of the same, Fig. 3 is a vertical section on the line 3—3 of Fig. 1, Fig. 4 is a bottom view of the reversing-jacks, Fig. 5 is a side view of a thermal cut-out device employed in connection with the switch, Fig. 6 is a longitudinal vertical section of the motor on the line 6—6 of Fig. 1, and Fig. 7 is a circuit-diagram of the motor and switch mechanism.

In carrying out my invention according to the illustrated embodiment thereof, I provide a pair of coaxially arranged cylindrical coils 10 and 11 which are wound upon a spool 12 of insulating material, said spool being provided with slightly spaced intermediate disks 13, between which the inside terminals of the coils are brought out and connected to each other and to one terminal of the circuit from which electrical energy is supplied to the coils. The other, or outside, terminals of the coils are connected each to one of the reversing-jacks 14 and 15. The spool 12 is mounted concentrically within a cylindrical casing 16 of magnetic material, carried upon a short tubular standard 17 having a base-flange 18 whereby the casing is mounted upon a suitable support, such as the plate 19 of insulating material. The tubular standard 17 affords a convenient outlet for the coil terminals. The casing 16 has at one end a head formed integrally therewith and provided centrally with a bearing 20 for the motor-shaft 21. The other end of the casing has a head 22 removably screwed therein, as shown in Fig. 6, and into the central portion of said head 22 is screwed the bearing-plug 23 through which the shaft 21 extends. Thrust-collars 24 are arranged upon the shaft 21 adjoining the inner ends of the bearings 20 and 23, and the portion of the shaft intermediate said thrust-collars has a plurality of helical ribs 25 formed integrally therewith. Upon the helically ribbed portion of the shaft is disposed slidably the tubular magnetic core or armature 26, the same having in the bore thereof portions 27 fitting between the ribs of the shaft, whereby longitudinal movements of the core or armature will cause the shaft to be rotated relatively thereto. A guide-rod 28, having its ends affixed in the heads of the casing, extends through a longitudinal opening in one side of the core, and prevents rotation of the core relative to the casing. The arrangement is such that reciprocating movements of the armature or core are caused by alternately energizing the coils 10 and 11, and said reciprocating movements cause corresponding alternating rotary movements of the shaft 21, which are utilized for actuating any desired mechanism, and also for actuating circuit-controlling means to open the circuit through each coil at the end of the armature-movement effected thereby, and to establish the circuit through the other coil for effecting the reverse movement of the armature and shaft.

In the illustrated structure, the circuits through the coils 10 and 11 are completed, respectively, through the reversing-jacks 14 and 15, each of which comprises a pair of U-shaped springs 29 carrying at their free ends contact-blocks 30 which are normally engaged with each other, the pairs of jack-springs being secured to the lower side of the insulating base-plate 19 adjacent to opposite ends of a slot 31 therein, and extending in the relation to said slot shown in Fig. 4. An arm 32 of insulating material is mounted pivotally on the motor-shaft 21 adjoining the bearing 20, and extends downwardly through the slot 31, between the adjoining ends of the jack-springs, said arm being movable about the shaft-axis to pass alternatively between the pairs of jack-springs, whereby to separate the contact-blocks 30 and open the respective coil-circuit. A handle 33 is secured to the motor-shaft 21 adjoining the arm 32, and upon the hub-portion of said handle are a pair of laterally extending pins 34 which straddle the arm 32, said pins being so spaced angularly of the shaft-axis as to engage the arm and actuate the same with the shaft during the concluding portion of its rotation in each direction.

In the drawings the described oscillating motor is shown as applied for actuating a switch mechanism suitable for controlling a three-phase circuit. In said structure a small eccentric 35 is provided at each end of the motor-shaft 21, each eccentric fitting rotatably within an intermediate portion of a lever 36, which is retained in place upon the eccentric by an end-plate 37. One end of each lever 36 is connected pivotally with a push-rod 38 which extends downwardly therefrom, the lower portion of the rod passing slidably through a spring-cup 39 seated loosely in an opening in the plate 19. The lower end of each push-rod is threaded and provided with lock-nuts 40, and about the rod, between the head portion thereof and the cup 39 is a coil spring 41 which serves to yieldingly lift the end of the lever to which the push-rod is pivoted. The opposite ends of the levers are connected by a transverse bar 42 which carries beneath the same the contact-plates 51, 52 and 53, each suitably insulated from the bar.

Beneath each of the contact-plates 51, 52 and 53 there is arranged a pair of yieldingly supported contacts 43, formed by cylindrical head portions on plungers 44 fitting loosely within tubular posts 45 mounted fixedly upon the insulating base-plate 19. The plungers 44 have stems 46 extending through the posts, the protruding lower ends of said stems being threaded and provided with nuts 47. Coil springs 48 are disposed about said stems 46 beneath the plungers, and press upwardly thereon, upward movement of the plungers being limited by the nuts 47. In the position of the eccentrics 35 shown by full lines in Fig. 3, the levers 36 are raised to hold the plates 51, 52 and 53 out of engagement with the contacts 43. By rotation of the motor-shaft and said eccentrics in a clockwise direction to the position shown by dotted lines in said Fig. 3, the plates 51, 52 and 53 are caused to engage the heads 43, the initial engagement being made near one side of the contact-plates. By a continuation of the rotation of the motor-shaft and eccentrics, the contact-plates are drawn across the heads 43, so that at the termination of the movement the contact-plates are centered relatively to the heads, as shown in Fig. 2. By the reverse rotation of the motor-shaft and eccentrics, the levers 36 are raised to the initial or switch-opening position.

A pair of the contacts 43 is connected in each of the branches 61, 62 and 63 of the three-phase main circuit controlled by the switch mechanism, the input or supply wires of said main circuit being connected with binding-posts 71, 72 and 73 on the base 19, the output connections from the switch being made to the binding-posts 81, 82 and 83 on the base 19, and suitable connections 91, 92 and 93 being made between said binding-posts and the lower ends of the stems 46 of the plungers 44. Interposed in the branches 91 and 93 of the main circuit through the switch mechanism, are automatic cut-out devices, each including a U-plate 49 of metal which is subject to thermal distortion by the heat resulting from its resistance to a flow of current in excess of that desired to be transmitted by the switch. One end of each U-plate 49 is supported by a bench-plate 54 mounted on the base 19, and the other end is supported by an angle-bracket 55. On the intermediate portion of the U-plate 49 is a finger 56 having a down-turned end portion which normally engages a lip 57 on the latch-bar 58 which is slidably mounted in the bench-plate 54. On the intermediate portion of the latch-bar is a collar 59, between which and the end of the bench-plate a spring 60 is coiled around the bar, said spring tending to move the bar to the right as viewed in Figs. 1 and 5, and such movement being normally prevented by the engagement of the lip 57 with the finger 56. By heating of the U-plate the finger 56 is raised to release the latch-bar, as shown by dotted lines in Fig. 5. A re-setting bar 64 is mounted slidably in the bench-plates 54, extending parallel with the latch-bars 58, and having fingers 65 extending laterally adjacent to the ends of the latch-bars. Upon the release of either latch-bar, its spring 60 moves the bar to the right, so that it engages the respective finger 65 and actuates the bar 64. By said movement of the bar 64 one of the fingers 65 is engaged with the spring 66 of the cut-out jack formed by said spring 66 and a second spring 67. The jack-springs 66 and 67 are normally in disengaged or non-contacting relation to each other, but by the pressure of the finger 65 upon the spring 66 the latter is caused to engage the spring 67, thereby closing a motor-circuit, as hereinafter described, to effect opening of the main switch. When the U-plates 49 are in normal formation, both latch-bars may be set to normal position by pushing the bar 64 to the left, whereby the fingers 65 are engaged with the ends of the latch-bars and the lip 57 of each latch-bar is moved past the end of the finger 56 of the respective U-plate, the spring 60 being thus compressed and held under compression until the respective latch-bars are again released.

In the illustrated structure the base-plate 19 carries binding-posts 74, 75 and 76 which are connected, respectively, with the center or common wire 77, and the two return wires 78 and 79 from a double-throw circuit-closing means, such as a thermostat, located at any place from which it is desired to control operations of the switch mechanism. As shown in Fig. 7, the binding-posts 75 and 76 are connected, respectively, with the reversing-jacks 14 and 15 by suitable conductors 85 and 86, and conductors 95 and 96 connect said jacks with the motor-coils 10 and 11. A conductor 84 forms a connection from the branch 61 of the main circuit, at the binding-post 71, to the binding-post 74, and also to the spring 66 of the cut-out jack. A conductor 94 connects the spring 67 of the cut-out jack with the reversing-jack 15, whereby the cut-out jack is placed in parallel with that side of the circuit-closing means 80 which is connected through said jack 15 with the motor-coil 11. The common terminal of the motor-coils 10 and 11 is connected by a conductor 95 with the binding-post 73.

In the operation of the described switch mechanism, the main circuit 61—62—63 is closed by the action of the oscillating motor resulting from energization of the motor-coil 10, the closing movement actuating the arm 32 to engage the reversing-jack 14 and open the circuit through the coil 10. Then the circuit through the motor-coil 11 may be closed, either by the device 80 or the cut-out jack, and upon energization of said coil the motor-shaft is actuated to open the main-switch, the arm 32 is moved to open the motor-circuit at the jack 15, and the circuit through the coil 10 is re-established at the jack 14, so that upon operation of the device 80 the closing of the main switch may be again effected.

It will be seen that in the described oscillating motor the limited rotational movements of the shaft 21 will be made with great rapidity, whereby the motor is ideally adapted for use as the motive element of any mechanism, such as the described automatic switch, requiring limited rotary movement in alternating directions. By the use of the motor for actuating a switch, the rapidity with which the closing and opening movements of the latter are effected, reduces to a minimum the formation of arcs and the burning or pitting of the contacts of the switch. The automatic operation of the reversing-jacks for the motor-circuits insures the alternate operation of the motor-coils, and the immediate opening of each coil-circuit at the termination of the movement caused by energization of the respective coil. The motor-circuits are also readily adaptable for connection with auxiliary controlling devices, as illustrated in the described switch mechanism by the use of the cut-out jack 66—67 for automatically causing opening of the main switch by an overload of the circuit controlled thereby.

Now, having described my invention, what I claim and desire to secure by Letters Patent is:

1. An electric motive device for producing limited rotary movements in alternating directions, comprising a pair of coaxially arranged coils, a core movable reciprocatingly within said coils by alternate energization thereof, a rotatable shaft extending through said reciprocating core and having helical means interengaging therewith, means for preventing longitudinal movement of the shaft, means for preventing rotary movement of said core, circuits connecting said coils with a source of current for energizing the same, controlling means connected in each of said coil-circuits, and means connected with said shaft and actuating said controlling means to open each coil-circuit during the movement of the parts effected by energization of the respective coil.

2. In an electric motive device for producing limited rotary movements in alternating directions, comprising a pair of cylindrical coaxially arranged coils, a casing of magnetic material inclosing said coils and having shaft-bearings at the ends thereof, a magnetic core mounted slidably within said coils and movable reciprocatingly by alternate energization thereof, a shaft extending through said core and having portions mounted in said bearings at the ends of the casing and retained in fixed longitudinal relation thereto, said shaft having helical members interengaging with said core, guide-means extending through said core to prevent rotation thereof, means connecting said coils with a source of current, and controlling means connected in the coil-circuits and adapted to close the same alternatively.

3. In an electric motive device for producing limited rotary movements in alternating directions, a magnetic core mounted for reciprocating movements, coils disposed about said core and connected with a source of current for energizing the same, circuit-controlling means for the coil-circuits operable to close the respective circuits for energizing the coils alternatively, a shaft having helical means interengaging with said core, said shaft being mounted for rotation in fixed longitudinal relation to said coils and said helical interengaging means being adapted to rotate the shaft alternatingly by reciprocating movements of the core, an arm pivoted on said shaft and extending laterally therefrom to the coil-circuit controlling means, and means affixed to the shaft and engageable with said arm for actuating the same with the shaft during the concluding portion of its rotation in each direction.

4. In an electric motive device for producing limited rotary movements in alternating directions, a pair of coaxially arranged cylindrical coils, a core mounted slidably within said coils and movable reciprocatingly by alternate energization thereof, a shaft mounted for rotation in fixed longitudinal relation to said coils and having helical means interengaging with said core whereby the shaft is rotated alternatingly by reciprocation of said core, circuits connecting said coils with a source of current, contacts arranged in said coil-circuits, and a member actuated by said shaft and controlling said contacts.

5. In an electromotor device, a reciprocatingly movable tubular member of magnetic material, a shaft extending longitudinally through said tubular member and mounted for rotative movement relative thereto, means for preventing longitudinal movement of said shaft, means for preventing rotation of said tubular member, helical elements on said shaft interengaging with portions of the tubular member and adapted to rotate the shaft in alternating directions during reciprocating movements of the tubular member, and means for actuating said tubular member, said actuating means including a solenoidal coil arranged about said member and connected with a source of electrical energy.

6. In an electromotor device, a helically ribbed motor-shaft mounted for rotation in fixed bearings and restrained from longitudinal movement, a tubular magnetic core disposed slidably upon the helically ribbed portion of said shaft and provided in the bore thereof with portions fitting between the helical ribs whereby longitudinal reciprocating movements of said core effect rotation of the shaft relative to the core in alternating directions, guide-means engaging said core to prevent rotation thereof, and means for actuating said core, said actuating means including a solenoidal coil connected with a source of electric current for energizing the same.

7. A structure as set forth in claim 6, including means actuated by alternating rotary movements of the shaft and controlling the current through said coil.

8. In an electromotor device, a reciprocatingly movable tubular member of magnetic material, a shaft extending through said tubular member and mounted for rotative movement relative thereto, means for preventing longitudinal movement of said shaft, guide-means for preventing rotation of said tubular member, helical means interconnecting said shaft and tubular member whereby reciprocating movements of said member longitudinally of the shaft effect relative rotation thereof in alternating directions, and means for actuating said tubular member reciprocatingly, said actuating means including a solenoidal coil arranged coaxially with said shaft and connected with an energizing source of electric current.

JAMES WHALEN.